(12) United States Patent
Holaus et al.

(10) Patent No.: US 8,193,467 B2
(45) Date of Patent: Jun. 5, 2012

(54) INSULATOR WITH DISC-SHAPED CARRIER ELEMENT

(75) Inventors: Walter Holaus, Zurich (CH); David Saxl, Zurich (CH)

(73) Assignee: ABB Technology AG, Zurich (CH)

( * ) Notice: Subject to any disclaimer, the term of this patent is extended or adjusted under 35 U.S.C. 154(b) by 987 days.

(21) Appl. No.: 12/016,605

(22) Filed: Jan. 18, 2008

(65) Prior Publication Data

US 2008/0179171 A1     Jul. 31, 2008

(30) Foreign Application Priority Data

Jan. 25, 2007   (DE) .................. 10 2007 004 656

(51) Int. Cl.
  *H01H 33/02*     (2006.01)
(52) U.S. Cl. ........................................ 218/155; 174/144
(58) Field of Classification Search .......... 218/153–155, 218/134, 139, 2, 11–14, 43; 174/142, 144, 174/152 R, 158 R, 167–169

See application file for complete search history.

(56) References Cited

U.S. PATENT DOCUMENTS

| 4,123,618 | A | * | 10/1978 | Cushing et al. | .......... 174/11 BH |
| 4,477,691 | A | * | 10/1984 | Giboulet et al. | ............ 174/22 C |
| 4,791,247 | A | * | 12/1988 | Cacalloro et al. | ......... 174/152 R |
| 6,610,933 | B2 | * | 8/2003 | Baker et al. | ................ 174/152 R |
| 7,071,416 | B2 | * | 7/2006 | Ricco et al. | .................... 174/100 |

* cited by examiner

*Primary Examiner* — Renee S Luebke
*Assistant Examiner* — Marina Fishman
(74) *Attorney, Agent, or Firm* — Buchanan Ingersoll & Rooney PC

(57) ABSTRACT

The disclosure relates to an insulator for positioning an electrical conductor in a gas chamber in a housing of a gas-insulated switchgear assembly, which comprises an electrically insulating disc-shaped carrier element with at least one cutout for passing through an electrical conductor. At least one notch for accommodating a clamp element is arranged on the outer circumference of the carrier element at least one point.

3 Claims, 4 Drawing Sheets

INSULATOR WITH DISC-SHAPED CARRIER ELEMENT

RELATED APPLICATION

This application claims priority under 35 U.S.C. §119 to German Patent Application No. 10 2007 004 656.3 filed in the German Patent Office on 25 Jan. 2007, the entire contents of which are hereby incorporated by reference in their entireties.

TECHNICAL FIELD

The disclosure relates to an insulator for positioning an electrical conductor in a gas-insulated switchgear assembly. The disclosure furthermore relates to a housing unit for a gas-insulated switchgear assembly.

BACKGROUND INFORMATION

Housings of gas-insulated switchgear assemblies generally have circular openings for passing through electrical conductors, a connecting flange being provided around an opening. The electrical conductors to be passed through are in this case positioned by means of disc-shaped, circular insulators in such a way that they maintain predetermined minimum distances from one another and from the housing.

Such an insulator is in this case fastened on a connecting flange, for example by means of a plurality of screws. It is likewise possible to screw a fastening ring to the connecting flange, the insulator being clamped in between the fastening ring and the connecting flange.

Fitting an insulator on a housing is therefore comparatively complex.

SUMMARY

The object of the disclosure is to specify an insulator which can be fastened to a housing of a gas-insulated switchgear assembly more easily.

An insulator is disclosed for positioning an electrical conductor in a gas chamber in a housing of a gas-insulated switchgear assembly, comprising an electrically insulating disc-shaped carrier element with at least one cutout for passing through an electrical conductor, wherein at least one notch for accommodating a clamp element is arranged on the outer circumference of the carrier element at least one point.

A housing unit for a gas-insulated switchgear assembly is disclosed, comprising a housing, which surrounds a gas chamber and has at least one opening for passing through at least one electrical conductor, wherein an insulator having an electrically insulating disc-shaped carrier element with at least one notch is provided, the insulator being fastened to the housing by means of at least one clamp element, the clamp element being inserted into the notch of the insulator and being fastened to the housing.

BRIEF DESCRIPTION OF THE DRAWINGS

The disclosure, further configurations and improvements of the disclosure and further advantages will be explained in more detail with reference to the drawings, which illustrate exemplary embodiments of the disclosure, and in which.

DETAILED DESCRIPTION

An insulator according to the disclosure has at least one notch for accommodating a clamp element on the outer circumference of its carrier element at least one point.

During fitting, the insulator is positioned onto the connecting flange of the housing and is fastened on the connecting flange by means of one or more clamp elements, which are inserted into the corresponding notches. The clamp elements are in this case fitted to the connecting flange, for example by means of screws.

The fastening of the insulator to the connecting flange is therefore advantageously simplified.

In accordance with an advantageous configuration of the disclosure, the carrier element of the insulator has, at least on one front side in the vicinity of the outer circumference, a groove for accommodating a sealing ring. By means of this sealing ring, the sealtightness of the sealed gas chamber is advantageously increased.

In accordance with a further advantageous configuration of the disclosure, an electrically conductive contact element for connecting a phase conductor is inserted into the cutout of the carrier element, which contact element protrudes beyond at least one front side of the carrier element. When connecting a phase conductor to the contact element there is then only one contact point.

Figure 1:
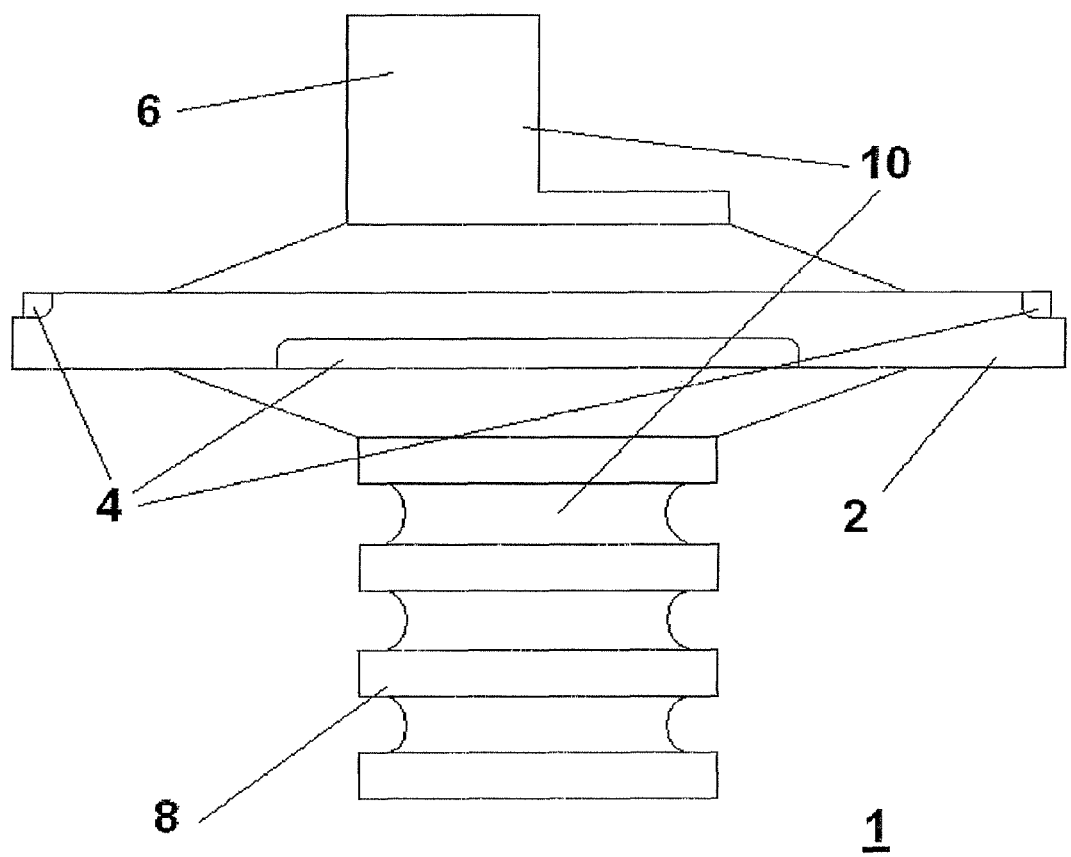
FIG. 1 shows an insulator in side view.

FIG. 1 illustrates an insulator 1 for a gas-insulated switchgear assembly in a side view. The insulator 1 can be used in particular in medium-voltage switchgear assemblies with a rated voltage in the range of from 1 kV to 100 kV and in high-voltage switchgear assemblies with a rated voltage in the range of from 100 kV to 500 kV. Use in switchgear assemblies with a higher or lower rated voltage is also conceivable. The insulator 1 can be used both in single-phase-encapsulated AC voltage switchgear assemblies and in three-phase-encapsulated AC voltage switchgear assemblies or in DC voltage switchgear assemblies.

The insulator 1 comprises a disc-shaped carrier element 2 with a circular cross section. Other cross sections, for example oval or rectangular, are also conceivable. Notches 4, which are used for accommodating clamp elements (not shown here), are arranged on both sides of the carrier element 2.

In the illustration shown, in each case two diametrically opposite notches 4 are arranged on each side of the carrier element 2. Other numbers and arrangements of the notches 4 are also conceivable. It is in particular conceivable to provide a peripheral notch 4.

In the axial direction, the carrier element 2 has a bore which is hidden in this illustration and into which an electrically conductive contact element 10 is inserted. The contact element 10 protrudes on both sides axially out of the carrier element 2.

On one side, the contact element 10 has a plug-type contact 8 for connecting a phase conductor. On the opposite side, the contact element 10 has a screw-type contact 6 for connecting a phase conductor.

In each case one phase conductor can be connected to the contact element 10 on both sides of the carrier element. The two phase conductors and the contact element 10 in this case form a conductor, which is passed through the carrier element 2. This conductor has only two contact points.

In conventional insulators, the contact element is embedded in the carrier element, i.e. does not protrude axially out of said carrier element. In order to connect a phase conductor, first a plug-type or screw-type contact needs to be fastened to the contact element and then the phase conductor is connected to the fastened plug-type or screw-type contact. In this case, the conductor, which comprises two phase conductors, two plug-type or screw-type contacts and one contact element, has four contact points.

In the case of the insulator 1 shown here, the number of contact points is therefore advantageously reduced.

Figure 2:
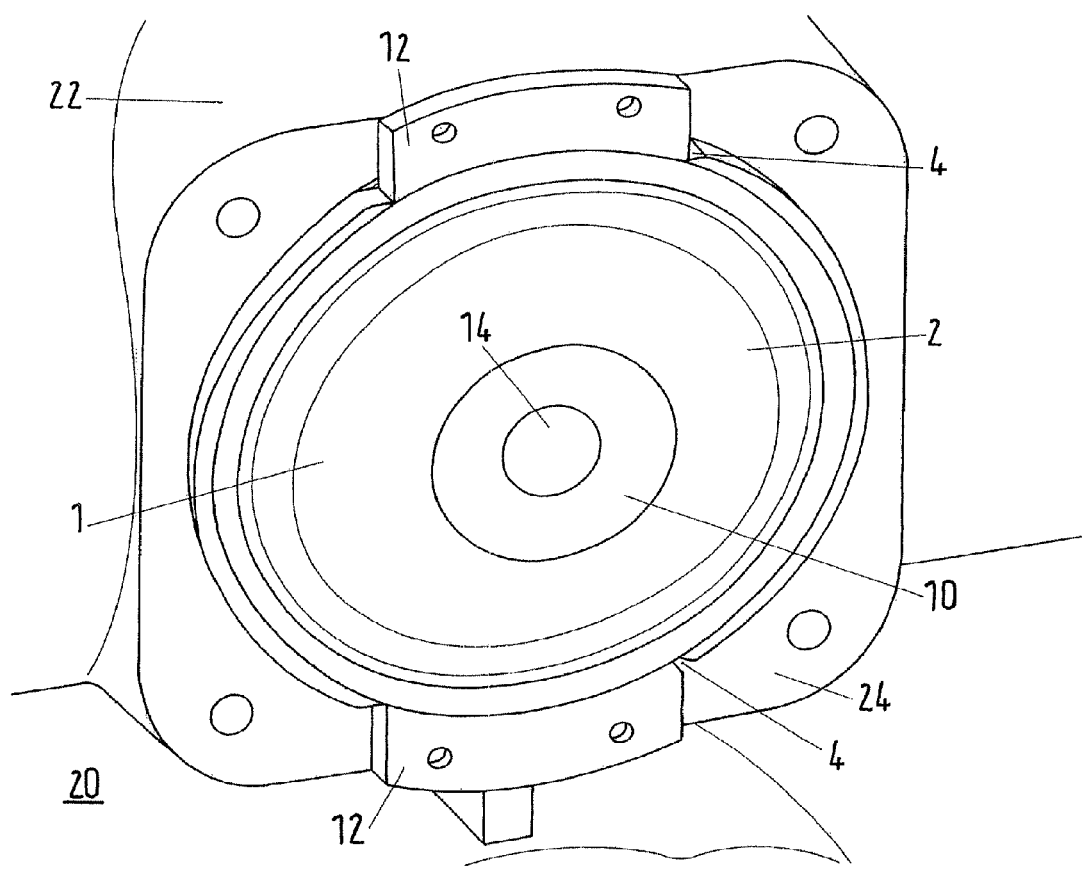
FIG. 2 shows a housing unit with an insulator.

FIG. 2 illustrates a housing unit 20, which comprises a first housing 22 surrounding a gas chamber and an insulator 1. The first housing 22 has a connecting flange 24, on which the insulator 1 is arranged. The carrier element 2 of the insulator 1 has two notches 4, into which in each case one clamp element 12 is inserted. The clamp elements 12 are fastened to the connecting flange 24 by means of screws (not illustrated here).

In this example, the contact element 10 has an inner bore 14, through which a gas exchange between the gas chamber in the interior of the first housing 22 and a gas chamber in the interior of a second housing adjoining the first housing 22 can take place.

The insulator 1 shown here comprises a contact element 10, which is inserted into a bore of the carrier element 2. This insulator 1 can be used, for example, in a single-phase-encapsulated switchgear assembly. Likewise, this insulator 1 can be used in a three-phase-encapsulated switchgear assembly, in which the conductor bushings are designed to be single-phase. It is also conceivable for an insulator to comprise three contact elements for passing through three conductors in a three-phase-encapsulated switchgear assembly.

Figure 3:
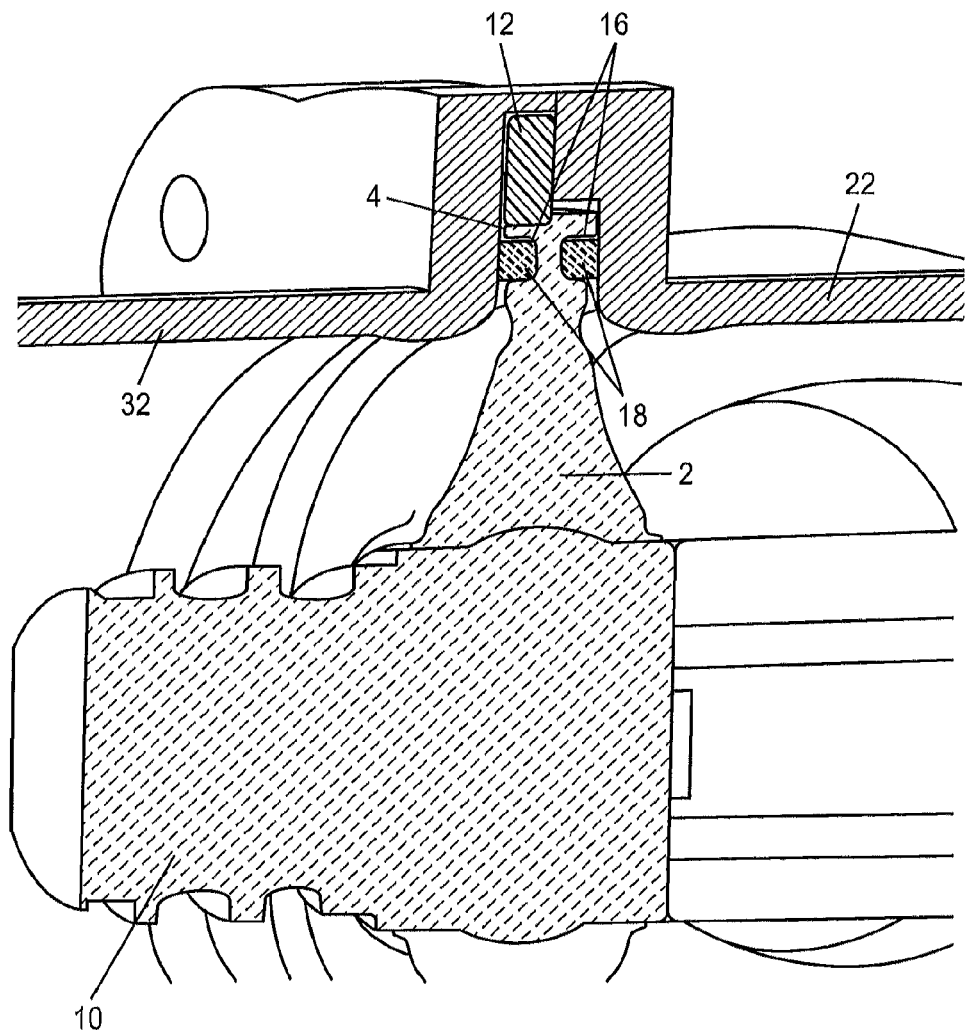
FIG. 3 shows a section through a switchgear assembly with an insulator.
Figure 4:
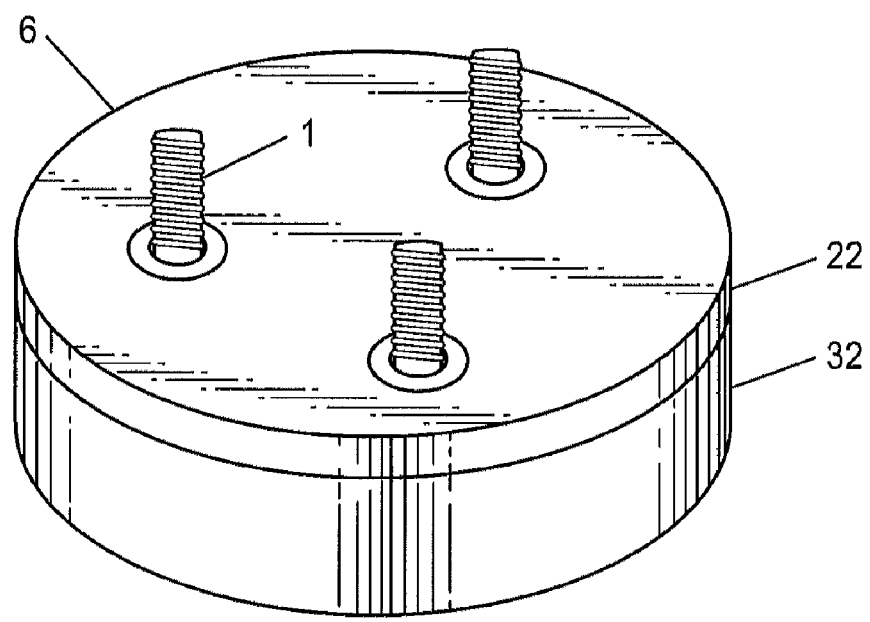
FIG. 4 shows a carrier element having three cutouts for passing through in each case one electrical conductor.

FIG. 3 illustrates a sectional view of a switchgear assembly at the connection point between a first housing 22 and a second housing 32. An insulator 1 is arranged between the first housing 22 and the second housing 32 in such a way that the insulator 1 seals off the gas chamber in the interior of the first housing 22 and the gas chamber in the interior of the second housing 32.

The insulator 1 comprises, in addition to the carrier element 2 and the contact element 10, two sealing rings 18, which are each located in a groove 16 of the carrier element 2. The insulator 1 is fastened to the first housing 22 by means of a clamp element 12, which is inserted into a notch 4 of the carrier element 2.

The second housing 32 is fastened to the first housing 22 in such a way that the sealing rings 18 located in the grooves 16 bear against the first housing 22 and against the second housing 32 and therefore seal off the gas chambers in the interior of the housings 22, 32 from one another and towards the outside.

When fitting the arrangement shown in FIG. 3, first the insulator 1 is fastened to the first housing 22 by means of the clamp elements 12. The clamp elements 12 in the process press the carrier element 2 against the first housing 22 in such a way that one sealing ring 18 is pressed against the housing 22 in the region of the clamp elements 12. In regions which are further removed from the clamp elements 12, the pressing force is not so great.

If the pressure of the gas chamber in the interior of the housing 22 is increased to a relatively great extent, the sealing ring 18 yields in the regions where the pressing force is not so great and allows the superatmospheric pressure to escape. An insulator which is fastened by means of clamp elements 12 therefore ensures that the pressure in the interior of a sealed gas chamber does not exceed a specific value. An excessive pressure in the interior of a gas chamber represents a source of danger during fitting for the fitter if, for example, an insulator breaks. This source of danger is eliminated owing to the fact that the insulator is fastened by means of the clamp elements 12.

Once the insulator 1 has been fastened by means of the clamp elements 12, an evacuation of the gas chamber, i.e. removal of the contained air, and subsequent filling with SF6 gas is possible. When evacuating the gas chamber, a subatmospheric pressure results which presses the carrier element 2 and therefore the sealing ring 18 completely against the housing 22. After the evacuation, the gas chamber can be filled with SF6 gas at a low superatmospheric pressure.

If the second housing 32 is now fitted to the first housing 22, the second housing 32 presses onto the adjacent sealing ring 18, while the first housing 22 likewise presses onto the adjacent sealing ring 18. In this way, complete pressing of the sealing ring 18 against the housings 22, 32 results. Once the second housing 32 has been fitted on the first housing 22, the pressure in the gas chambers can therefore be increased up to the rated pressure.

When attaching a test adaptor to the first housing 22, the sealing ring 18 is similarly pressed completely against the housing 22 and the gas chamber of the housing 22 can be filled with SF6 gas up to the rated pressure.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCE SYMBOLS

1 Insulator
2 Carrier element
4 Notch
6 Screw-type contact
8 Plug-type contact
10 Contact element
12 Clamp element
14 Inner bore
16 Groove
18 Sealing ring
20 Housing unit
22 First housing
24 Connecting flange
32 Second housing

What is claimed is:

1. An insulator for positioning an electrical conductor in a gas chamber in a housing of a gas-insulated switchgear assembly, comprising:
   an electrically insulating carrier element having a disc-shaped portion with first and second opposing sides and at least one through-hole for passing through an electrical conductor, wherein the carrier element includes,
     at least one notch for accommodating a clamp element is arranged on an outer circumference of the carrier element at least one point, and
     a groove for accommodating a sealing ring, formed in at least one of the first and second sides closer to the outer circumference than the at least one through-hole,
   wherein an electrically conductive contact element for connecting a phase conductor is inserted into the through-hole, the contact element protruding beyond at least one side of the carrier element, the contact element having at least one of a plug-type contact and screw-type contact, and an axial inner bore for gas exchange.

2. The insulator according to claim 1, wherein the carrier element has three through-holes for passing through in each case one electrical conductor.

3. A housing unit for a gas-insulated switchgear assembly, comprising a housing, which surrounds a gas chamber and has at least one opening for passing through at least one electrical conductor, wherein an insulator according to claim 1 is provided, the insulator being fastened to the housing by at least one clamp element, the clamp element being inserted into the notch of the insulator and being fastened to the housing.

* * * * *